US012811870B2

(12) United States Patent
Liu

(10) Patent No.: US 12,811,870 B2
(45) Date of Patent: *Nov. 24, 2026

(54) DEVICE AND METHOD FOR TESTING NETWORK SWITCH

(71) Applicant: Alpha Networks Inc., Hsinchu City (TW)

(72) Inventor: Chun-En Liu, Hsinchu City (TW)

(73) Assignee: Alpha Networks Inc., Hsinchu City (TW)

( * ) Notice: Subject to any disclaimer, the term of this patent is extended or adjusted under 35 U.S.C. 154(b) by 64 days.

This patent is subject to a terminal disclaimer.

(21) Appl. No.: 18/985,031

(22) Filed: Dec. 18, 2024

(65) Prior Publication Data

US 2026/0081862 A1 Mar. 19, 2026

(30) Foreign Application Priority Data

Sep. 18, 2024 (TW) ................................ 113135287

(51) Int. Cl.
*H04L 43/50* (2022.01)
*H04L 43/0882* (2022.01)

(52) U.S. Cl.
CPC .......... *H04L 43/50* (2013.01); *H04L 43/0882* (2013.01)

(58) Field of Classification Search
CPC ............................ H04L 43/50; H04L 43/0882
See application file for complete search history.

(56) References Cited

U.S. PATENT DOCUMENTS 8,619,599 B1 * 12/2013 Even ....................... H04L 43/50 370/242
10,341,259 B1 * 7/2019 Singh ...................... H04L 45/42
(Continued)

FOREIGN PATENT DOCUMENTS

CN 105897494 A * 8/2016
CN 112187574 A * 1/2021 ......... H04L 43/0817
(Continued)

OTHER PUBLICATIONS

Bibliographic Data of Taiwan Patent No. 1559704 (Supplied by Applicant on IDS, p. 2, Foreign Patent Documents), 10 pages. Publication date Nov. 21, 2016. (Year: 2016).*

*Primary Examiner* — Richard G Keehn
(74) *Attorney, Agent, or Firm* — C.I.P.O. IP GROUP

(57) ABSTRACT

A network switch testing device and a method for testing at least one network switch involve a central processing unit (CPU), an acceleration port that can be enabled with internal loopback and an access control list, and at least one transmission port connectable with at least one to-be-tested transmission port of the to-be-tested network switch(es). The acceleration port and the transmission port(s) are set to the same virtual local area network (VLAN). The CPU transmits at least one packet to the acceleration port. The acceleration port circulates therein the packet(s) through internal loopback and according to the access control list to make the packet(s) reach a predetermined line rate, and transmits the predetermined-line-rate-reaching packet(s) to the transmission port(s) through VLAN's flooding mechanism. The transmission port(s) transmits the predetermined-line-rate-reaching packet(s) to the to-be-tested transmission port(s). The CPU stops the transmission port(s) from transmitting the packet(s) when the testing time ends.

6 Claims, 4 Drawing Sheets

(56) References Cited

U.S. PATENT DOCUMENTS

| | | | | |
|---|---|---|---|---|
| 10,587,491 | B1 * | 3/2020 | Volpe | H04L 43/50 |
| 10,659,571 | B1 * | 5/2020 | Volpe | H04L 43/50 |
| 10,666,775 | B1 * | 5/2020 | Volpe | H04L 43/50 |
| 11,076,025 | B1 * | 7/2021 | Volpe | H04L 43/50 |
| 2017/0366442 | A1 | 12/2017 | Marelli | |
| 2018/0017615 | A1 | 1/2018 | Moody | |
| 2023/0023154 | A1 * | 1/2023 | Yu | H04L 43/087 |
| 2024/0056393 | A1 * | 2/2024 | Rong | H04L 45/745 |

FOREIGN PATENT DOCUMENTS

| | | | | | |
|---|---|---|---|---|---|
| CN | 112653593 | A | * | 4/2021 | H04L 43/50 |
| JP | H18-2006245849 | A | | 9/2006 | |
| JP | 2009225404 | A | * | 10/2009 | |
| JP | H21-2009225404 | A | | 10/2009 | |
| JP | H22-2010118823 | A | | 5/2010 | |
| JP | H29-6171704 | B2 | | 8/2017 | |
| TW | 201613313 | A | | 4/2016 | |
| TW | I559704 | B | * | 11/2016 | |
| WO | 2024087676 | A1 | | 5/2024 | |

* cited by examiner

DEVICE AND METHOD FOR TESTING NETWORK SWITCH

CROSS-REFERENCE TO RELATED PATENT APPLICATION

This non-provisional application claims priority to and the benefit of, under 35 U.S.C. § 119(a), Taiwan Patent Application No. 113135287, filed Sep. 18, 2024 in Taiwan. The entire content of the above identified application is incorporated herein by reference.

FIELD

The present disclosure relates to a testing device and a testing method, and more particularly to a network switch testing device and a method for testing at least one network switch.

BACKGROUND

Network switches must have their packet forwarding function tested during the manufacturing process. As the data transfer rate required of a network has increased significantly, it is essential that network switch tests support high data rates, too. Currently, network switch tests in the industry are mainly performed by using transmitting and receiving packets through external network performance testing equipment in order to calculate the overall transfer rate. However, the network performance testing equipment on the market (e.g., the Spirent Test Center and IXIA) is very expensive and will incur subsequent maintenance expenses, thus leading to cost-inefficient production. In addition, the commercially available network performance testing equipment has fewer transmission ports and therefore cannot test at the same time a plurality of to-be-tested network switches, leading to prolonged testing time and increased costs and expenses.

Previously, Applicant has developed a technique of testing at least one to-be-tested network switch by using as the testing device the network switch(es) that has been verified as conforming to standards. The technique involves: a first acceleration port; a second acceleration port; at least one transmission port that can connect with at least one to-be-tested transmission port of at least one to-be-tested network switch; and a central processing unit (CPU). The CPU can: generate at least one packet; transmit the at least one packet to the first acceleration port; clear the packet count of the first acceleration port, the packet count of the second acceleration port, every packet count of the at least one transmission port, and every forwarding list of the at least one transmission port; stop media access control (MAC) address learning of the first acceleration port, MAC address learning of the second acceleration port, and MAC address learning of the at least one transmission port; and enable internal loopback in the first acceleration port, and internal loopback in the second acceleration port. The first acceleration port, the second acceleration port and the at least one transmission port are set to the same virtual local area network (VLAN). The first acceleration port and the second acceleration port can use internal loopbacks and a flooding mechanism of the VLAN to make the at least one packet reach a predetermined line rate, and transmit the at least one packet that has reached the predetermined line rate to the at least one transmission port. The at least one transmission port can transmit the at least one packet that has reached the predetermined line rate to the at least one to-be-tested transmission port of the at least one to-be-tested network switch. The quality of the at least one to-be-tested network switch is determined according to the number of the at least one packet transmitted and received by the testing device.

Although the above-referenced technique can lower the cost of using the external testing equipment and increase the production capacity, it requires using two acceleration ports to reach the predetermined line rate. When it is required to test different VLANs'packets at multiple to-be-tested network switches, acceleration ports of twice the number of VLANs are needed, and therefore the transmission ports for testing would be less than enough, thereby limiting the number of the network switches that can be tested at the same time. Accordingly, one of the issues addressed in the present disclosure is to further reduce the time and cost required for testing high-speed network switches, and to increase production capacity.

SUMMARY

Certain aspects of the present disclosure are directed to a network switch testing device. The network switch testing device includes: an acceleration port, at least one transmission port, and a CPU. The at least one transmission port is configured to connect with at least one to-be-tested transmission port of at least one to-be-tested network switch. The CPU is configured to: generate at least one packet; transmit the at least one packet to the acceleration port; clear a packet count of the acceleration port, every packet count of the at least one transmission port, and every forwarding list of the at least one transmission port; stop MAC address learning of the acceleration port, and MAC address learning of the at least one transmission port; and enable internal loopback in and an access control list of the acceleration port. The acceleration port and the at least one transmission port are set to the same VLAN. The acceleration port is configured to circulate therein the at least one packet through internal loopback and according to the access control list to make the at least one packet reach a predetermined line rate in the acceleration port, and transmit the at least one packet that has reached the predetermined line rate to the at least one transmission port through a flooding mechanism of the VLAN. The at least one transmission port is configured to transmit the at least one packet that has reached the predetermined line rate to the at least one to-be-tested transmission port of the at least one to-be-tested network switch. The CPU is configured to stop the at least one transmission port from transmitting the at least one packet when a testing time ends.

In certain embodiments, the at least one transmission port is a plurality of transmission ports, and the predetermined line rate is different for each of the plurality of transmission ports.

In certain embodiments, the access control list redirects the at least one packet to the acceleration port and the at least one transmission port.

Certain aspects of the present disclosure are directed to a method for testing at least one network switch. The method includes: providing a testing device and at least one to-be-tested network switch, wherein the testing device comprises a CPU and a plurality of ports, and the at least one to-be-tested network switch comprises at least one to-be-tested transmission port; clearing, by the CPU, VLAN settings of the plurality of ports of the testing device, and setting, by the CPU, one of the plurality of ports of the testing device as an acceleration port, and at least another one of the remaining ports of the testing device as at least one transmission port;

clearing, by the CPU, a packet count of the acceleration port, and every packet count of the at least one transmission port, and clearing, by the CPU, every forwarding list of the at least one transmission port; stopping, by the CPU, MAC address learning of the acceleration port, and MAC address learning of the at least one transmission port; enabling, by the CPU, internal loopback in and an access control list of the acceleration port; setting, by the CPU, the acceleration port and the at least one transmission port to the same VLAN; transmitting, by the CPU, at least one packet to the acceleration port; making, by the acceleration port, the at least one packet reach a predetermined line rate by circulating the at least one packet in the acceleration port through internal loopback and according to the access control list, and transmitting, by the acceleration port, the at least one packet that has reached the predetermined line rate to the at least one transmission port through a flooding mechanism of the VLAN; transmitting, by the at least one transmission port, the predetermined-line-rate-reaching at least one packet to the at least one to-be-tested transmission port of the at least one to-be-tested network switch, and receiving, by the at least one transmission port or another port of the testing device, the at least one packet transmitted back by the at least one to-be-tested transmission port of the at least one to-be-tested network switch; stopping, by the CPU, the at least one transmission port of the testing device from transmitting the at least one packet when a testing time ends; and determining a packet transmission quality of the at least one to-be-tested network switch according to a number of the at least one packet transmitted by the testing device and a number of the at least one packet received by the testing device.

In certain embodiments, the access control list redirects the at least one packet to the acceleration port and the at least one transmission port.

In certain embodiments, the at least one packet is a plurality of packets, the CPU is configured to generate the plurality of packets, the at least one transmission port is a plurality of transmission ports, a first one of the transmission ports is set with a first predetermined line rate different from or the same as a second predetermined line rate of a second one of the transmission ports, the first one of the transmission ports is configured to transmit at least one of the packets at the first predetermined line rate, and the second one of the transmission ports is configured to transmit at least one of the packets at the second predetermined line rate.

The device and method in the present disclosure for testing at least one network switch use software to set the ports of the testing device as traffic generator groups, and each traffic generator group needs only set a single acceleration port and at least one transmission port, thereby increasing the number of the transmission ports in the traffic generator groups and the number of the to-be-tested network switches. A user can adjust the packet(s) according to practical needs, and different transmission ports can be set to transmit packets at different predetermined line rates, thereby allowing multiple to-be-tested network switches to be tested simultaneously. This not only complies with the testing requirements of the industry, but also can increase the scope and accuracy of tests and greatly reduce the time and cost required for testing so that the production capacity of network switches can be raised.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

The present disclosure is more particularly described in the following examples that are intended as illustrative only since numerous modifications and variations therein will be apparent to those skilled in the art.

Figure 1:
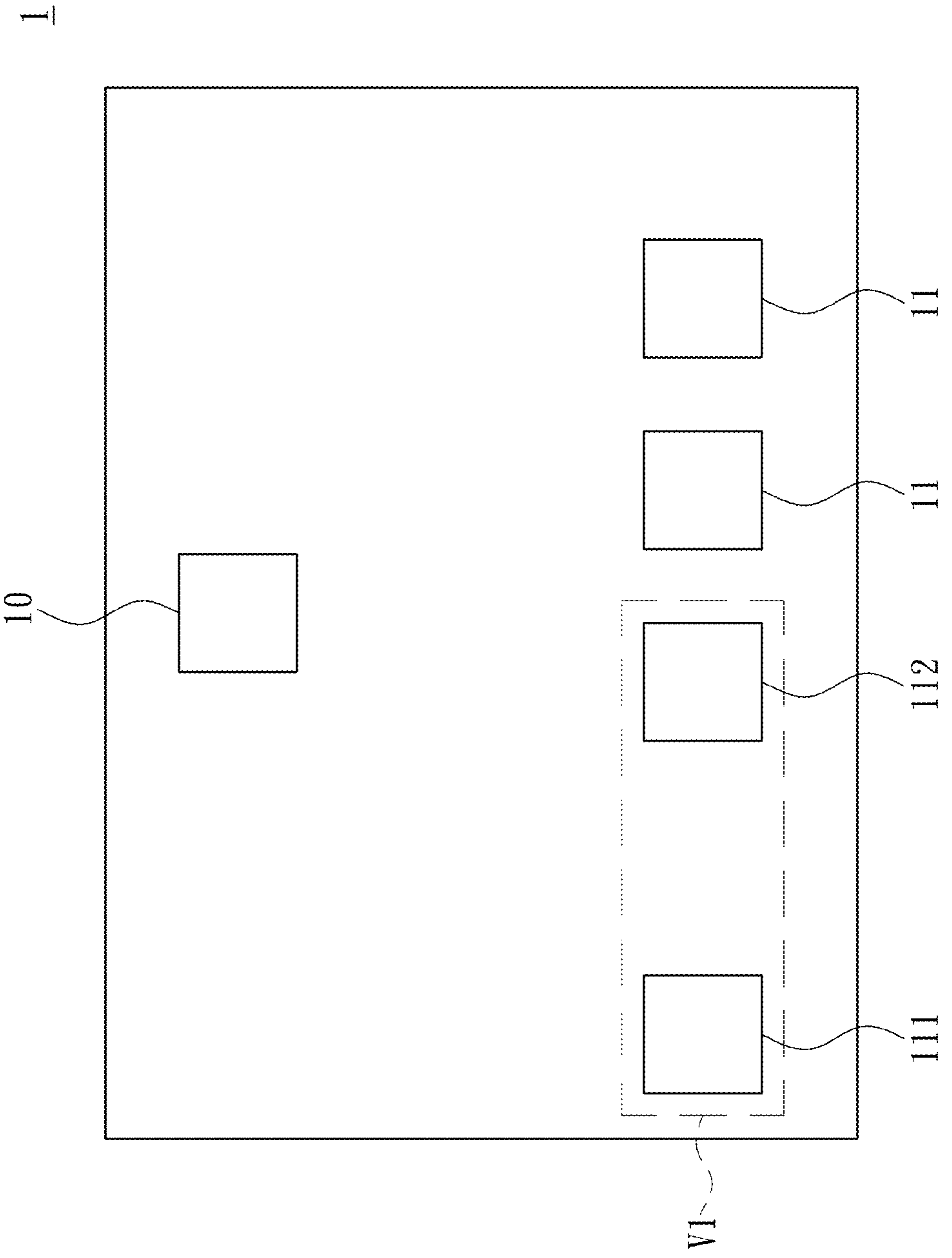
FIG. 1 is a block diagram of a testing device for testing at least one network switch according to certain embodiments in the present disclosure.

FIG. 1 is a block diagram of a testing device for testing at least one network switch (hereinafter also referred to as a network switch testing device or a testing device for short) according to certain embodiments in the present disclosure. As shown in FIG. 1, the network switch testing device 1 includes a CPU 10 and a plurality of ports 11, and stores software for the Ethernet traffic generator (ETG). The network switch testing device 1 can be an Ethernet switch that has been verified to have the desired line rate (e.g., 100 Gb/s, 200 Gb/s, 400 Gb/s, 800 Gb/s, or higher) and specifications.

Before testing a network switch, the CPU 10 performs the following procedures: clearing the VLAN settings of all the ports 11; setting one of the ports 11 as the acceleration port 111, and at least another port 11 as at least one transmission port 112; clearing the packet count of the acceleration port 111, stopping MAC address learning of the acceleration port 111, and enabling internal loopback in the acceleration port 111 and the access control list of the acceleration port 111; clearing the packet count and the forwarding list of the transmission port 112, and stopping MAC address learning of the transmission port 112; and setting the acceleration port 111 and the transmission port 112 as an ETG group, and setting the acceleration port 111 and the transmission port 112 that are in the same ETG group to the same VLAN V1.

When testing a network switch, the transmission port 112 is connected to the to-be-tested transmission port of the to-be-tested network switch (not shown) through a line, and then the CPU 10 generates at least one type of at least one packet and transmits the packet(s) to the acceleration port 111. The packet(s) is looped back in the acceleration port 111 through internal loopback, and the packet(s) looped back to the acceleration port 111 is redirected to all the ports in the same VLAN V1 (i.e., to the acceleration port 111 and the transmission port 112) according to the access control list. After being circulated through internal loopback and according to the access control list for a certain period of time, the packet(s) reaches a predetermined line rate in the acceleration port 111 and is transmitted to the transmission port 112 through the flooding mechanism of the VLAN V1, wherein the predetermined line rate can be determined according to the full line rate of the to-be-tested network switch. The packet(s) having reached the predetermined line rate is transmitted by the transmission port 112 to the to-be-tested transmission port of the to-be-tested network switch. In turn, the to-be-tested transmission port of the to-be-tested network switch transmits the packet(s) back to the transmission port 112 or to an unset port 11. When the testing time ends, the CPU 10 stops the transmission port 112 from transmitting packets. The quality of packet transmission by the to-be-tested network switch (including the correctness of the number of packets, the existence/absence of error packets, and whether or not the packet sizes are as expected) can then be determined according to the number of the packet(s) transmitted and number of the packet(s) received by the network switch testing device 1.

Figure 2:
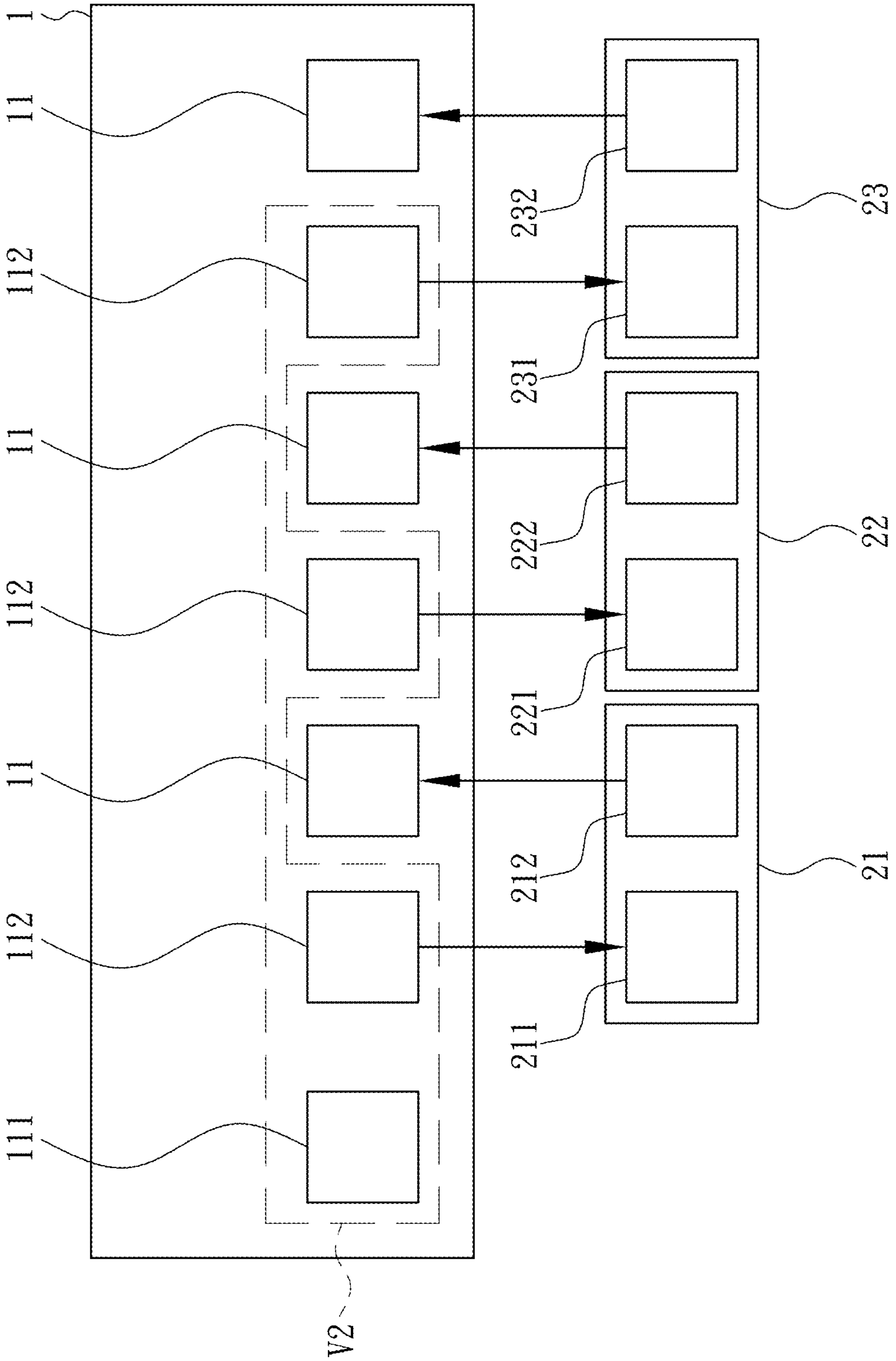
FIG. 2 schematically shows a one-way packet transmission test performed on a plurality of to-be-tested network switches by the network switch testing device according to certain embodiments in the present disclosure.

FIG. 2 shows how a network switch testing device according to certain embodiments of the present disclosure tests a plurality of to-be-tested network switches by one-way packet transmission. As shown in FIG. 2, the network switch testing device 1 includes a CPU (not shown) and a plurality of ports 11 (e.g., 32 or 48 ports 11) and stores ETG software. The ports 11 include an acceleration port 111 and three transmission ports 112. The acceleration port 111 and the transmission ports 112 are set to the same VLAN V2. The two to-be-tested transmission ports 211 and 212 of the to-be-tested network switch 21 are connected to one of the transmission ports 112 and an unset port 11 of the network switch testing device 1, respectively, through lines. The two to-be-tested transmission ports 221 and 222 of the to-be-tested network switch 22 are connected to another of the transmission ports 112 and another unset port 11 of the network switch testing device 1, respectively, through lines. The two to-be-tested transmission ports 231 and 232 of the to-be-tested network switch 23 are connected to the other transmission port 112 and yet another unset port 11 of the network switch testing device 1, respectively, through lines. The acceleration port 111, the transmission ports 112, an ETG group, and the VLAN V2 are set in the following procedures.

Before testing the to-be-tested network switches 21, 22, and 23, the CPU performs the following procedures according to the ETG software: clearing the VLAN settings of all the ports 11 of the network switch testing device 1 (such that none of the ports 11 is in any VLAN); selecting one of the ports 11 as the acceleration port 111 and three other ports 11 as the transmission ports 112, clearing the packet count of the acceleration port 111, stopping MAC address learning of the acceleration port 111, enabling internal loopback and the access control list of the acceleration port 111, clearing the packet counts and the forwarding lists of the transmission ports 112, and stopping MAC address learning of the transmission ports 112; setting the acceleration port 111 and the three transmission ports 112 as an ETG group; setting the acceleration port 111 and the three transmission ports 112 that are in the same ETG group to the same VLAN V2 while leaving the remaining ports 11 outside any VLAN; and setting the packet contents (which include: destination address (DA), source address (SA), Ethernet type, packet data, packet size, and tagged or untagged).

Based on practical needs, a user can adjust the packet contents through the CPU to generate packets that are the same type or different, and can through the CPU set the respective predetermined line rates of the transmission ports, and the predetermined line rates of the transmission ports for transmitting packets can be the same or different. In certain embodiments, two untagged types of packets are used for testing.

To test the to-be-tested network switches 21, 22, and 23, the CPU generates a certain number (e.g., a number containing only the units digit, a number containing the tens and units digits, or a number containing the hundreds, tens, and units digits) of untagged packets of two types and transmits the packets to the acceleration port 111. As internal loopback of the acceleration port 111 is enabled, the packets are looped back to the acceleration port 111. As the access control list of the acceleration port 111 is also enabled, the packets looped back to the acceleration port 111 are redirected according to the access control list to the three transmission ports 112 and the acceleration port 111 that are in the same VLAN V2. After being circulated through internal loopback and according to the access control list for a certain period of time, the packets reach the predetermined line rate(s) in the acceleration port 111. The predetermined line rate(s) can be determined according to the full line rates of the to-be-tested network switches 21, 22, and 23. For example, in order to test the to-be-tested network switches 21 and 22 that have design line rates of 400 Gb/s and the to-be-tested network switch 23 that has a design line rate of 100 Gb/s at the same time, the line rates of the transmission ports 112 connected to the to-be-tested network switches 21 and 22 can be set at 400 Gb/s, and the line rate of the transmission port 112 connected to the to-be-tested network switch 23 can be set at 100 Gb/s. Since the transmission ports 112 and the acceleration port 111 are set to the same VLAN V2, the packets in the acceleration port 111 that have reached the predetermined line rate(s) will be flooded to the three transmission ports 112, and each of the three transmission ports 112 will in turn transmit the packets that have reached the corresponding predetermined line rate to the to-be-tested transmission port 211, 221, or 231 of the corresponding to-be-tested network switch 21, 22, or 23. After receiving the packets, each of the three to-be-tested network switches 21, 22, and 23 transmits the packets through the other to-be-tested transmission port 212, 222, or 232 to the corresponding unset port 11 of the network switch testing device 1.

The user can set the testing time in advance or decide the testing time during the test. For example, if it is desired to transmit packets for five minutes, the user can preset the testing time at five minutes or stop the transmission of packets with an instruction given at the end of the five-minute period. When the testing time is up, the CPU clears the forwarding list of the acceleration port 111 to stop packet flooding, and the transmission ports 112 immediately stop transmitting packets. The forwarding list of the acceleration port 111 can be restored after a certain time (e.g., 0.2 second) so that the user can carry out another test. The user can connect an external computer device to the CPU of the testing device 1 in order to examinate the line rates and packet transmission quality (including, for example, the loss rate and error rate of the packets transmitted and received) of the to-be-tested network switches 21, 22, and 23 based on the numbers of the two types of packets transmitted by the transmission ports 112 and received by the unset ports 11 and the testing time.

Figure 3:
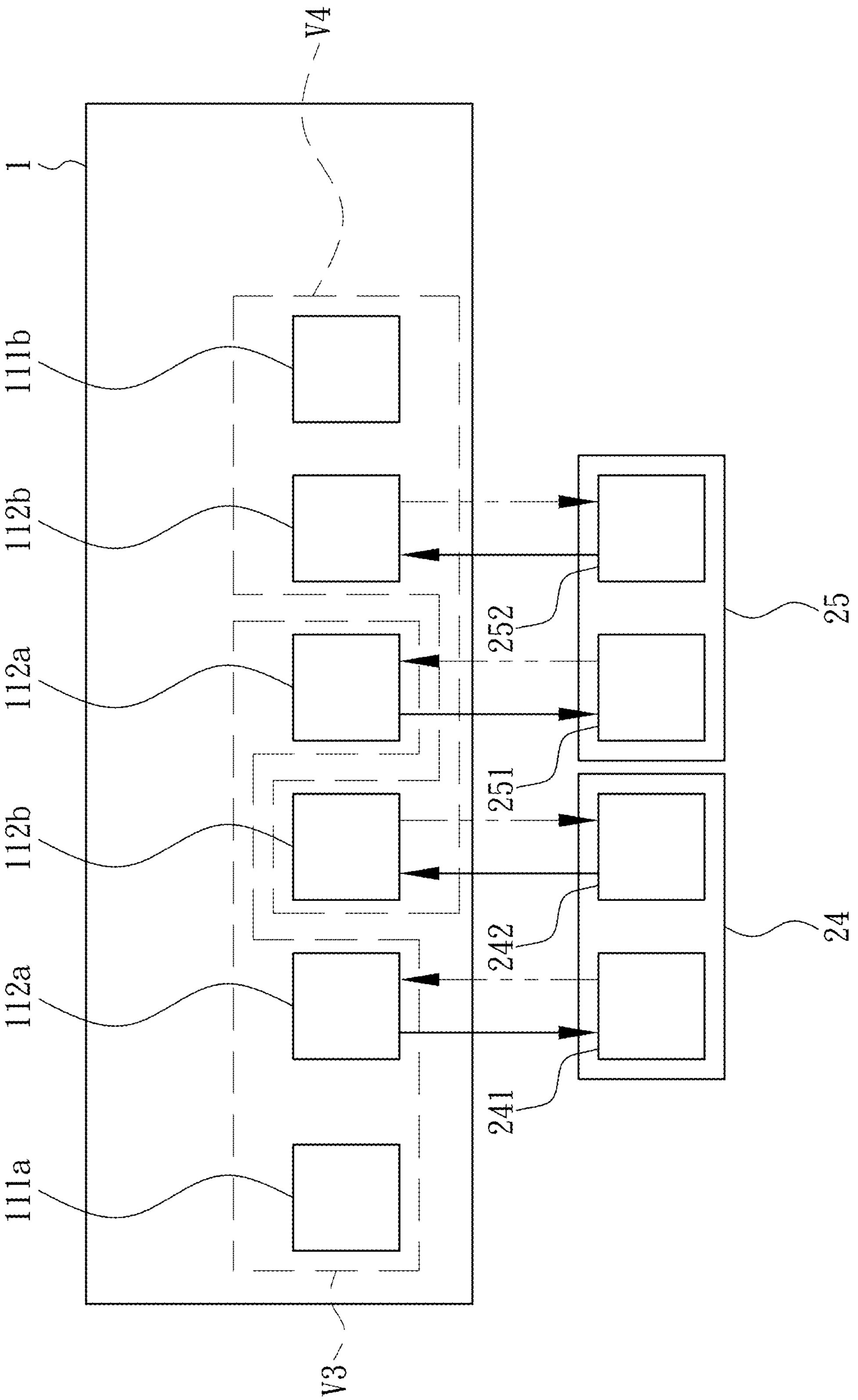
FIG. 3 schematically shows a two-way packet transmission test performed on a plurality of to-be-tested network switches by the network switch testing device according to certain embodiment in the present disclosure.

FIG. 3 shows how a network switch testing device according to certain embodiments of the present disclosure tests a plurality of to-be-tested network switches by two-way packet transmission. As shown in FIG. 3, the network switch testing device 1 includes a CPU (not shown) and a plurality of ports 11 (e.g., 32 ports 11) and stores ETG software. The ports 11 include an acceleration port 111*a*, an acceleration port 111*b*, two transmission ports 112*a*, and two transmission ports 112*b*. The acceleration port 111*a* and the two transmission ports 112*a* are set to the same VLAN V3, and the acceleration port 111*b* and the two transmission ports 112*b* are set to the same VLAN V4. The two to-be-tested transmission ports 241 and 242 of the to-be-tested network switch 24 are connected to one of the transmission ports 112*a* and one of the transmission ports 112*b* of the network switch testing device 1, respectively, through lines. The two to-be-tested transmission ports 251 and 252 of the to-be-tested network switch 25 are connected to the other transmission port 112*a* and the other transmission port 112*b* of the network switch testing device 1, respectively, through lines. The acceleration ports 111*a* and 111*b*, the transmission ports 112*a* and 112*b*, two ETG groups, and the VLANs V3 and V4 are set in the following procedures.

Before testing the to-be-tested network switches 24 and 25, the VLAN settings of all the ports 11 of the network switch testing device 1 are cleared; two of the ports 11 are selected as the two acceleration ports 111*a* and 111*b*, another two of the ports 11 are selected as the two transmission ports 112*a*, yet another two of the ports 11 are selected as the two transmission ports 112*b*, the packet counts of the acceleration ports 111*a* and 111*b* are cleared, MAC address learning of the acceleration ports 111*a* and 111*b* is stopped, internal loopback and the access control lists of the acceleration ports 111*a* and 111*b* are enabled, the packet counts and the forwarding lists of the transmission ports 112*a* and 112*b* are cleared, and MAC address learning of the transmission ports 112*a* and 112*b* is stopped; the acceleration port 111*a* and the two transmission ports 112*a* are set as a first ETG group, and the acceleration port 111*b* and the two transmission ports 112*b* are set as a second ETG group; the two transmission ports 112*a* and the acceleration port 111*a* that are in the first ETG group are set to the same VLAN V3, and the two transmission ports 112*b* and the acceleration port 111*b* that are in the second ETG group are set to the same VLAN V4, while the remaining ports 11 are kept outside any VLAN; and the contents of first packets and second packets are set, wherein in certain embodiments the first packets and the second packets are untagged packets.

To test the to-be-tested network switches 24 and 25, the CPU generates a certain number of first packets and second packets according to settings, transmits the first packets to the acceleration port 111*a* in the first ETG group, and transmits the second packets to the acceleration port 111*b* in the second ETG group. As internal loopback of the acceleration ports 111*a* and 111*b* is enabled, the first packets are looped back to the acceleration port 111*a*, and the second packets are looped back to the acceleration port 111*b*. As the access control lists of the acceleration ports 111*a* and 111*b* are also enabled, the first packets looped back to the acceleration port 111*a* are redirected according to the corresponding access control list to the acceleration port 111*a* and the two transmission ports 112*a* that are in the same VLAN V3, and the second packets looped back to the acceleration port 111*b* are redirected according to the corresponding access control list to the acceleration port 111*b* and the two transmission ports 112*b* that are in the same VLAN V4. After being circulated through internal loopback and according to the access control lists for a certain period of time, the first packets and the second packets reach their respective predetermined line rates in the acceleration ports 111*a* and 111*b* respectively, wherein the predetermined line rates can be determined according to the full line rates of the to-be-tested network switches 24 and 25. Since the transmission ports 112*a* and the acceleration port 111*a* are set to the same VLAN V3, and the transmission ports 112*b* and the acceleration port 111*b* are set to the same VLAN V4, the first packets in the acceleration port 111*a* that have reached the corresponding predetermined line rate will be flooded to the two transmission ports 112*a*, and the second packets in the acceleration port 111*b* that have reached the corresponding predetermined line rate will be flooded to the two transmission ports 112*b*. Each of the transmission ports 112*a* will in turn transmit the first packets that have reached the corresponding predetermined line rate to the to-be-tested transmission port 241 or 251 of the corresponding to-be-tested network switch 24 or 25, and each of the transmission ports 112*b* will in turn transmit the second packets that have reached the corresponding predetermined line rate to the to-be-tested transmission port 242 or 252 of the corresponding to-be-tested network switch 24 or 25. The to-be-tested transmission ports 241 and 251 transmit the first packets to the to-be-tested transmission ports 242 and 252, respectively, and the to-be-tested transmission ports 242 and 252 transmit the second packets to the to-be-tested transmission ports 241 and 251, respectively. The to-be-tested transmission ports 241 and 251 transmit the second packets to the transmission ports 112*a*, respectively, and the to-be-tested transmission ports 242 and 252 transmit the first packets to the transmission ports 112*b*, respectively (the transmission paths of the first packets are indicated by the solid-line arrows in FIG. 3 while the transmission paths of the second packets are indicated by the two-dot chain line arrows in FIG. 3). When the testing time is up, the CPU clears the forwarding lists of the acceleration ports 111*a* and 111*b* to stop packet flooding, and the transmission ports 112*a* and 112*b* immediately stop transmitting packets. The forwarding lists of the acceleration ports 111*a* and 111*b* can be restored after a certain time (e.g., 0.2 second) so that the user can carry out another test. The user can connect an external computer device to the CPU of the testing device 1 in order to examinate the line rates and packet transmission quality (including, for example, the loss rate and error rate of the packets transmitted and received) of the to-be-tested network switches 24 and 25 based on the numbers of the first packets and second packets transmitted and received by the transmission ports 112*a* and 112*b* and the testing time.

Through software settings, the plural ports of the network switch testing device 1 can be set as traffic generator groups, wherein each traffic generator group only requires one acceleration port to be set. This helps increase the number of transmission ports in each traffic generator group and hence the number of the to-be-tested network switches that can be tested at the same time, and in consequence, the time and cost required for testing can be reduced to raise production capacity.

Figure 4:
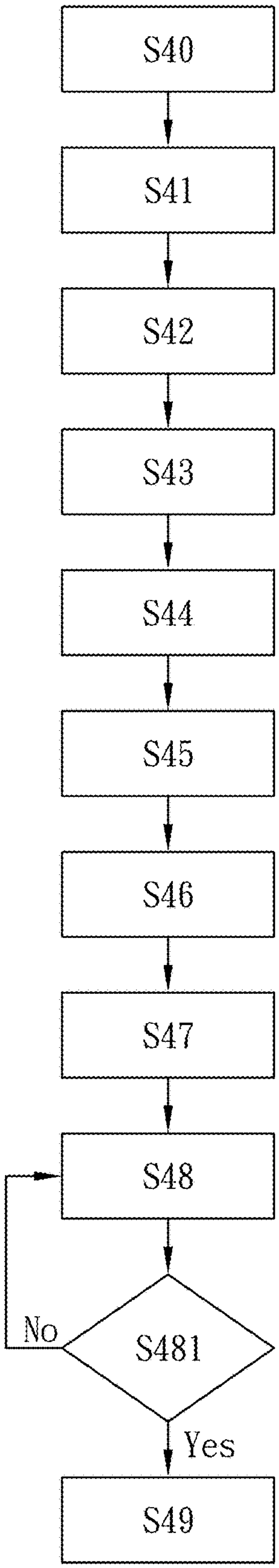
FIG. 4 is a flowchart of a method for testing at least one network switch according to certain embodiments in the present disclosure.

FIG. 4 is the flowchart of a method according to certain embodiments of the present disclosure for testing at least one network switch. As shown in FIG. 4, the method for testing at least one network switch includes the following steps.

Step S40: Providing a testing device and at least one to-be-tested network switch, wherein the testing device includes a CPU and a plurality of ports, and the to-be-tested network switch includes a plurality of to-be-tested transmission ports.

Step S41: Clearing, by the CPU, the VLAN settings of all the ports of the testing device, and setting, by the CPU, one of the ports of the testing device as an acceleration port and at least another one of the ports of the testing device as at least one transmission port.

Step S42: Clearing, by the CPU, the packet counts of the acceleration port and of the transmission port, and clearing, by the CPU, the forwarding list of the transmission port.

Step S43: Stopping, by the CPU, MAC address learning of the acceleration port and of the transmission port.

Step S44: Enabling, by the CPU, internal loopback and the access control list of the acceleration port.

Step S45: Setting, by the CPU, the acceleration port and the transmission port to the same VLAN.

Step S46: Transmitting, by the CPU, at least one packet to the acceleration port;

Step S47: Circulating the packet(s) through internal loopback and according to the access control list so that the packet(s) reaches a predetermined line rate in the acceleration port, and transmitting the packet(s) reaching the predetermined line rate to the transmission port through the flooding mechanism of the VLAN.

Step S48: Transmitting, by the transmission port, the packet(s) that has reached the predetermined line rate to a to-be-tested transmission port of the to-be-tested network switch, and receiving, by the transmission port or an unset port of the testing device, the packet(s) transmitted back by the to-be-tested transmission port.

Step S481: Determining whether the testing time is up. If not, back to Step S48. If the testing time is up, proceed to Step S49.

Step S49: Stopping, by the CPU, the transmission port from transmitting packets, and determining a packet transmission quality of the to-be-tested network switch according to the number of the packet(s) transmitted by the testing device and the number of the packet(s) received by the testing device.

In certain embodiments, the to-be-tested network switch is an Ethernet switch, and the testing device is an Ethernet switch that has been verified to have the desired line rate (e.g., 100 Gb/s, 200 Gb/s, 400 Gb/s, 800 Gb/s, or higher) and specifications. The packets may be of the same type or of different types. The packet(s) can be adjusted according to practical needs, for example, specifying, among others, the SA, DA, Ethernet type, packet data, packet size, and whether the packet(s) is tagged or untagged. In order to test multiple to-be-tested network switches at the same time, different transmission ports can be set to transmit packets at different predetermined line rates, and the different predetermined line rates can be set as required of each to-be-tested network switch.

It is noted that the sequence of steps S42-S45 may vary, and the present disclosure is not limited thereto. Prior to step S46, the user may preset the testing time using the timer of the CPU. By providing a preset testing time, the user can determine the time at which the test starts and ends, and hence the duration of the test, thereby adding to the flexibility of testing. In Step S49, the CPU clears the forwarding list of the acceleration port to stop the transmission port from transmitting packets, and after a certain time (e.g., 0.2 second) following the completion of Step S49, the CPU can restore the forwarding list of the acceleration port in preparation for the next test.

According to the above, the device and method for testing at least one network switch according to the present disclosure use software to set the ports of the testing device as the traffic generator group(s), each traffic generator group requiring only one acceleration port and at least one transmission port to be set. This helps increase the number of transmission ports in the traffic generator groups and hence the number of the to-be-tested network switches that can be tested at the same time. Moreover, a user may adjust the packets according to practical needs, and different transmission ports can be set to transmit packets at different predetermined line rates in order to test multiple to-be-tested network switches simultaneously. The device and method in the present disclosure, therefore, not only comply with the testing requirements of the industry, but also can increase the scope and accuracy of tests and greatly reduce the time and cost required for testing so as to raise the production capacity.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A network switch testing device, comprising:

an acceleration port;

at least one transmission port configured to connect with at least one to-be-tested transmission port of at least one to-be-tested network switch; and a central processing unit (CPU) configured to:

generate at least one packet;

transmit the at least one packet to the acceleration port;

clear a packet count of the acceleration port, every packet count of the at least one transmission port, and every forwarding list of the at least one transmission port;

stop media access control (MAC) address learning of the acceleration port, and MAC address learning of the at least one transmission port; and enable internal loopback in and an access control list of the acceleration port;

wherein the acceleration port and the at least one transmission port are set to the same virtual local area network (VLAN), the acceleration port is configured to circulate therein the at least one packet through internal loopback and according to the access control list to make the at least one packet reach a predetermined line rate in the acceleration port, and transmit the at least one packet that has reached the predetermined line rate to the at least one transmission port through a flooding mechanism of the VLAN, the at least one transmission port is configured to transmit the at least one packet that has reached the predetermined line rate to the at least one to-be-tested transmission port of the at least one to-be-tested network switch, and the CPU is configured to stop the at least one transmission port from transmitting the at least one packet when a testing time ends.

2. The network switch testing device according to claim 1, wherein the at least one transmission port is a plurality of transmission ports, and the predetermined line rate is different for each of the plurality of transmission ports.

3. The network switch testing device according to claim 1, wherein the access control list redirects the at least one packet to the acceleration port and the at least one transmission port.

4. A method for testing at least one network switch, comprising:

providing a testing device and at least one to-be-tested network switch, wherein the testing device comprises a central processing unit (CPU) and a plurality of ports, and the at least one to-be-tested network switch comprises at least one to-be-tested transmission port;

clearing, by the CPU, virtual local area network (VLAN) settings of the plurality of ports of the testing device, and setting, by the CPU, one of the plurality of ports of the testing device as an acceleration port, and at least another one of the remaining ports of the testing device as at least one transmission port;

clearing, by the CPU, a packet count of the acceleration port, and every packet count of the at least one transmission port, and clearing, by the CPU, every forwarding list of the at least one transmission port;

stopping, by the CPU, media access control (MAC) address learning of the acceleration port, and MAC address learning of the at least one transmission port;

enabling, by the CPU, internal loopback in and an access control list of the acceleration port;

setting, by the CPU, the acceleration port and the at least one transmission port to the same VLAN;

transmitting, by the CPU, at least one packet to the acceleration port;

making, by the acceleration port, the at least one packet reach a predetermined line rate by circulating the at least one packet in the acceleration port through internal loopback and according to the access control list, and transmitting, by the acceleration port, the at least one packet that has reached the predetermined line rate to the at least one transmission port through a flooding mechanism of the VLAN;

transmitting, by the at least one transmission port, the predetermined-line-rate-reaching at least one packet to the at least one to-be-tested transmission port of the at least one to-be-tested network switch, and receiving, by the at least one transmission port or another port of the testing device, the at least one packet transmitted back by the at least one to-be-tested transmission port of the at least one to-be-tested network switch;

stopping, by the CPU, the at least one transmission port of the testing device from transmitting the at least one packet when a testing time ends; and determining a packet transmission quality of the at least one to-be-tested network switch according to a number of the at least one packet transmitted by the testing device and a number of the at least one packet received by the testing device.

5. The method according to claim 4, wherein the access control list redirects the at least one packet to the acceleration port and the at least one transmission port.

6. The method according to claim 4, wherein the at least one packet is a plurality of packets, the CPU is configured to generate the plurality of packets, the at least one transmission port is a plurality of transmission ports, a first one of the transmission ports is set with a first predetermined line rate different from or the same as a second predetermined line rate of a second one of the transmission ports, the first one of the transmission ports is configured to transmit at least one of the packets at the first predetermined line rate, and the second one of the transmission ports is configured to transmit at least one of the packets at the second predetermined line rate.

* * * * *